United States Patent
Ichikawa et al.

(10) Patent No.: US 10,759,995 B2
(45) Date of Patent: *Sep. 1, 2020

(54) PROCESS FOR PRODUCING FLUORESCENT MATERIAL

(71) Applicant: DENKA COMPANY LIMITED, Tokyo (JP)

(72) Inventors: Masayoshi Ichikawa, Fukuoka (JP); Ryosuke Kondo, Fukuoka (JP); Hideyuki Emoto, Fukuoka (JP); Motoi Tanaka, Fukuoka (JP)

(73) Assignee: DENKA COMPANY LIMITED, Tokyo (JP)

( * ) Notice: Subject to any disclaimer, the term of this patent is extended or adjusted under 35 U.S.C. 154(b) by 356 days.

This patent is subject to a terminal disclaimer.

(21) Appl. No.: 15/551,860

(22) PCT Filed: Feb. 17, 2016

(86) PCT No.: PCT/JP2016/054545
§ 371 (c)(1),
(2) Date: Aug. 17, 2017

(87) PCT Pub. No.: WO2016/133110
PCT Pub. Date: Aug. 25, 2016

(65) Prior Publication Data
US 2018/0016494 A1    Jan. 18, 2018

(30) Foreign Application Priority Data

Feb. 18, 2015   (JP) .................................. 2015-029503
Feb. 18, 2015   (JP) .................................. 2015-029504
(Continued)

(51) Int. Cl.
*C09K 11/61*    (2006.01)
*C09K 11/66*    (2006.01)
(Continued)

(52) U.S. Cl.
CPC .......... *C09K 11/616* (2013.01); *C01B 33/10* (2013.01); *C01D 3/02* (2013.01); *C01D 3/22* (2013.01);
(Continued)

(58) Field of Classification Search
CPC ... H01L 33/502; H01L 33/504; H01L 33/507; H01L 33/52; H01L 33/616; H01L 33/617;
(Continued)

(56) References Cited

U.S. PATENT DOCUMENTS

2010/0142189 A1*   6/2010   Hong ................... C09K 11/616
                                                        362/97.3
2012/0299466 A1*   11/2012  Lyons ................. C09K 11/617
                                                        313/503
(Continued)

FOREIGN PATENT DOCUMENTS

JP          2013014715          1/2013

*Primary Examiner* — Matthew E. Hoban
*Assistant Examiner* — Lynne Edmondson
(74) *Attorney, Agent, or Firm* — Rudy J. Ng; Bozicevic, Field & Francis LLP

(57) ABSTRACT

The present invention relates to a process for producing a composite-fluoride fluorescent material represented by the general formula $A_2MF_6:Mn^{4+}$ (wherein A is at least one alkali metal element including K; M is one or more metallic elements including at least Si or Ge and selected from among Si, Ge, Sn, Ti, Zr, and Hf; F is fluorine; and Mn is manganese). With the production process, it is possible to obtain a fluorescent material which is high in absorptance, internal quantum efficiency, and external quantum efficiency and has excellent optical properties.

5 Claims, 4 Drawing Sheets

(30) Foreign Application Priority Data

Feb. 18, 2015 (JP) .................................. 2015-029505
Feb. 18, 2015 (JP) .................................. 2015-029506

(51) Int. Cl.
| | | |
|---|---|---|
| *C09K 11/64* | (2006.01) | |
| *C09K 11/02* | (2006.01) | |
| *C01B 33/10* | (2006.01) | |
| *C01G 45/00* | (2006.01) | |
| *C09K 11/08* | (2006.01) | |
| *C01D 3/02* | (2006.01) | |
| *C01D 3/22* | (2006.01) | |
| *C09K 11/57* | (2006.01) | |
| *C09K 11/59* | (2006.01) | |

(52) U.S. Cl.
CPC ............ *C01G 45/006* (2013.01); *C09K 11/08* (2013.01); *C09K 11/57* (2013.01); *C09K 11/59* (2013.01); *C09K 11/617* (2013.01); *C01P 2002/54* (2013.01)

(58) Field of Classification Search
CPC ... H01L 33/675; H01L 33/628; H01L 33/645; H01L 33/665; H01L 33/0838; H01L 33/02; H01L 33/664; H01L 2211/181; H01L 2211/188; H05B 33/14; Y02B 20/181; C09K 11/616; C09K 11/617; C09K 11/675; C09K 11/628; C09K 11/645; C09K 11/665; C09K 11/0838; C09K 11/02; C09K 11/664; C09K 2211/181; C09K 2211/188
USPC ...... 252/301.4 F, 301.4 H, 301.4 R, 301.6 F; 428/403

See application file for complete search history.

(56) References Cited

U.S. PATENT DOCUMENTS

2013/0241396 A1   9/2013   Hiramatsu et al.
2015/0329770 A1*  11/2015  Kaneyoshi ............... B05D 1/18
                                                  252/301.36

* cited by examiner

[Fig. 1]
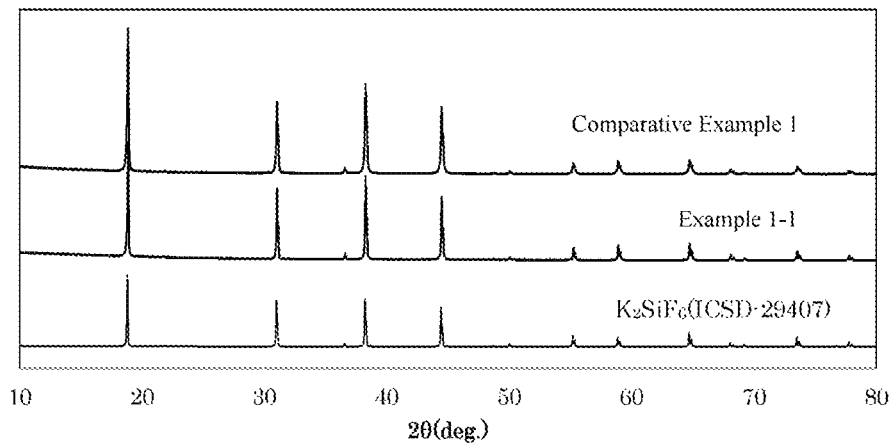
[Fig. 2]
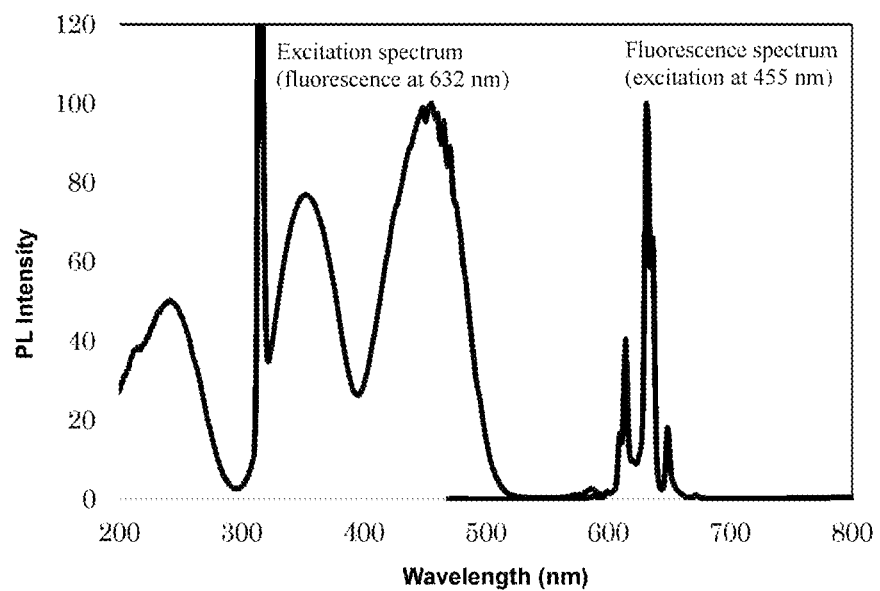

[Fig. 3]
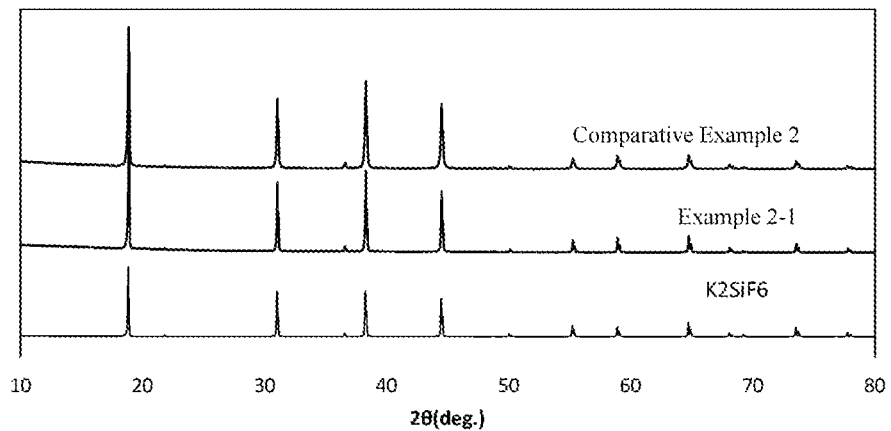
[Fig. 4]
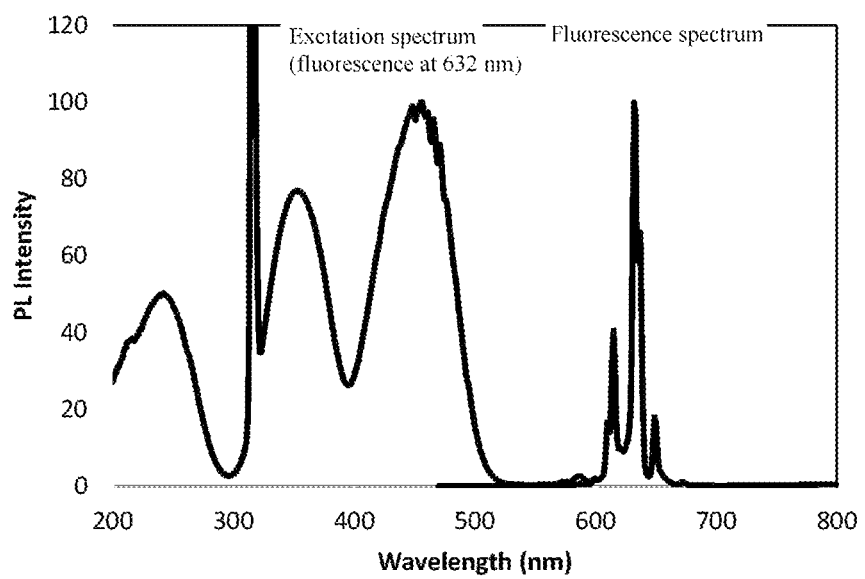

[Fig. 5]
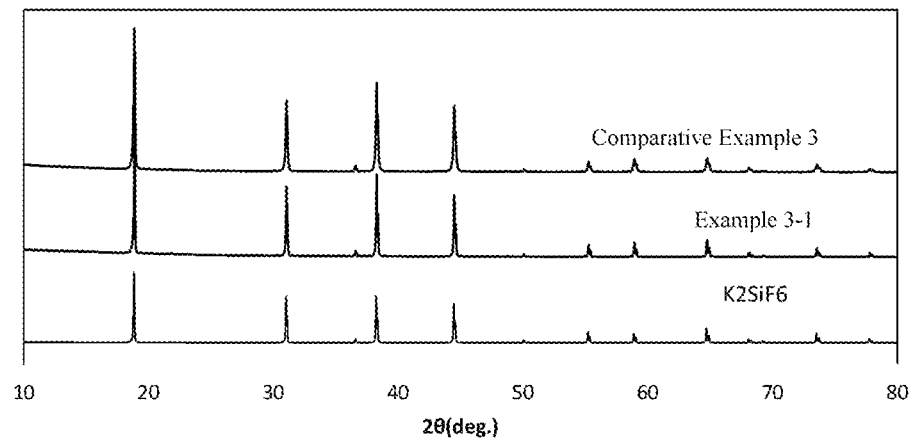
[Fig. 6]
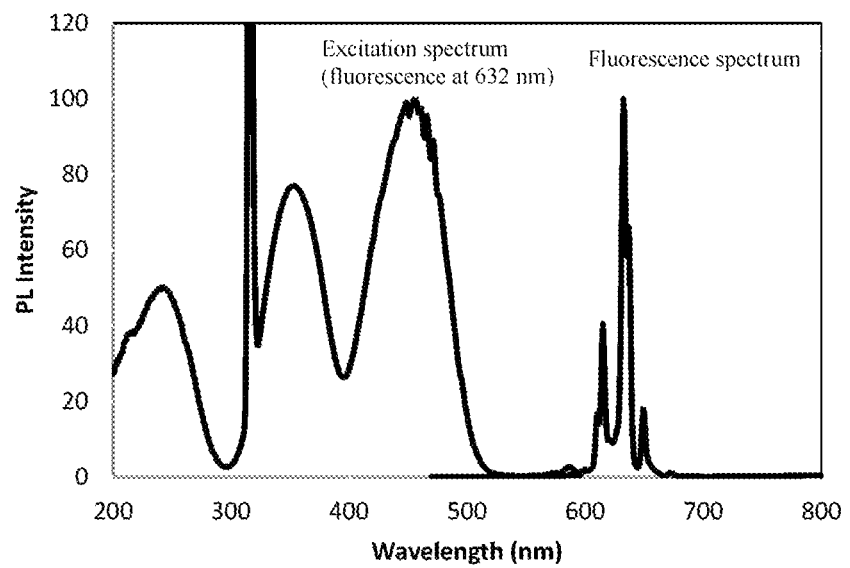

[Fig. 7]
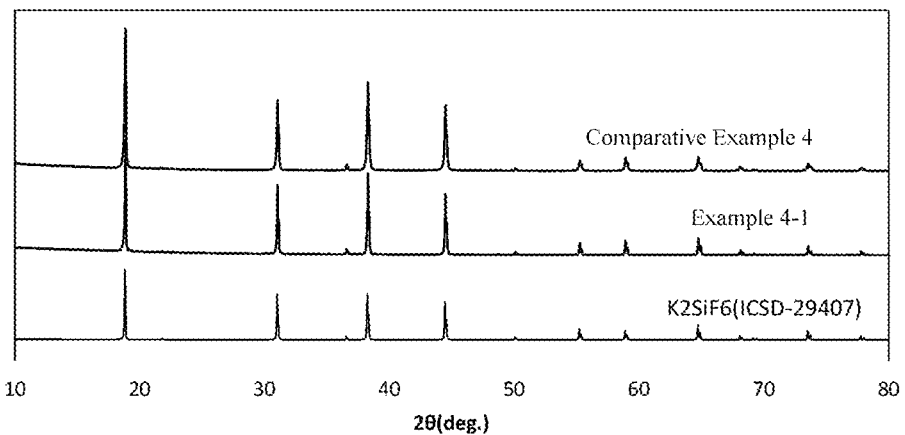
[Fig. 8]
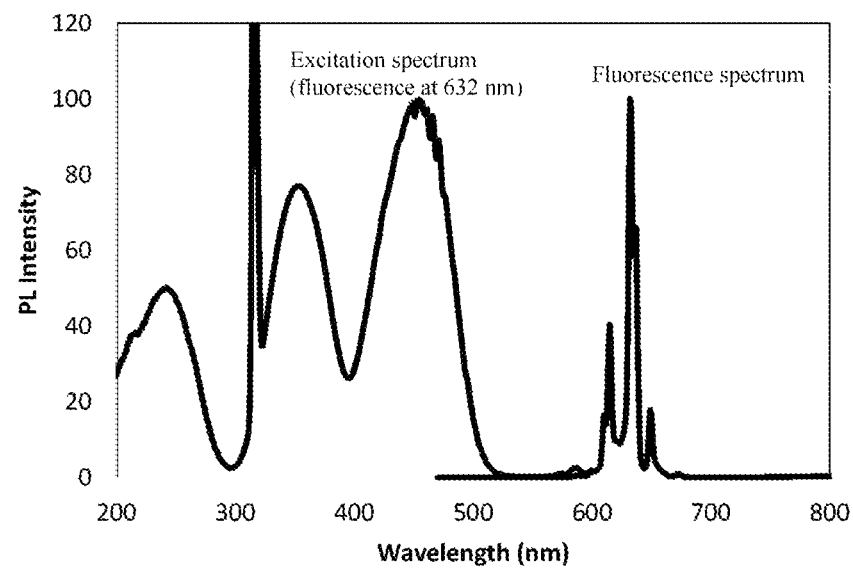

US 10,759,995 B2

PROCESS FOR PRODUCING FLUORESCENT MATERIAL

TECHNICAL FIELD

The present invention relates to a method for producing a phosphor that emits red light when excited with blue light. More specifically, the present invention relates to a method for producing a composite fluoride phosphor represented by the general formula $A_2MF_6:Mn^{4+}$ (where the element A is an alkali metal element including at least K; the element M is one or more metal elements chosen from among Si, Ge, Sn, Ti, Zr and Hf, including at least Si or Ge; F is fluorine, and Mn is manganese); the production method being able to result in a phosphor that has a high absorption rate, internal quantum efficiency and external quantum efficiency, and that has excellent optical properties.

BACKGROUND ART

As red phosphors, nitride phosphors such as $CaAlSiN_3:Eu$ and $(Sr,Ca)AlSiN_3:Eu$, and sulfide phosphors such as $(Ca,Sr)S:Eu$ are well known, but composite fluoride phosphors represented by the general formula $A_2MF_6:Mn^{4+}$ (where the element A is Li, Na, K, Rb, Cs, $NH_4$ or the like, and the element M is Ge, Si, Sn, Ti, Zr or the like) have attracted interest as red phosphors having an extremely sharp fluorescence spectrum and having high brightness while having a deep red color. These phosphors have a structure in which $Mn^{4+}$ is substituted as a solid solution at some of the tetravalent element M sites, and exhibit a fluorescence spectrum that combines multiple narrow-band emissions due to electron transitions in the $Mn^{4+}$.

As a method for producing such composite fluoride phosphors represented by $A_2MF_6:Mn^{4+}$, Patent Document 1 discloses a production method that involves preparing a reaction solution into which some of the constituent elements of the fluoride phosphor are dissolved, and adding the remaining constituent elements in the form of compounds in the solid state or in a reaction solution. In particular, the document describes a method wherein the raw material compounds are added and mixed, at a predetermined ratio, with hydrofluoric acid, and after all of the raw material compounds have dissolved, an organic compound-based poor solvent such as methanol, ethanol or acetone is added and the solubility is reduced to cause precipitation of the phosphor. Similarly, Patent Document 2 also describes that acetone was added to cause precipitation of a phosphor.

However, with the production method described in Patent Document 1 or 2, there is a tendency for the optical properties of the precipitated phosphor to be insufficient. The reason for this is believed to be due to the fact that, with methods that involve adding an organic compound-based poor solvent when causing precipitation of a phosphor, the $Mn^{4+}$, which is the emission center, is not stably and sufficiently incorporated into the phosphor. Additionally, when an organic compound-based poor solvent is added, substances other than the constituent elements of the phosphor become intermixed therein, thus resulting in impurities and loss of luminescence efficiency.

RELATED ART DOCUMENTS

Patent Documents

Patent Document 1: JP 2010-209311 A
Patent Document 2: U.S. Pat. No. 3,576,756 A

SUMMARY OF THE INVENTION

Problems to be Solved by the Invention

As a result of carrying out diligent study regarding methods for precipitation of phosphors after dissolving the raw materials in hydrofluoric acid, the present inventors discovered that a phosphor with significantly superior optical properties can be produced by carrying out precipitation under specific conditions without using an organic compound-based poor solvent, thereby completing the present invention.

Means for Solving the Problems

In other words, the present invention has the purpose of offering a method for producing a phosphor represented by the general formula $A_2MF_6:Mn^{4+}$ (where the element A is an alkali metal element including at least K; the element M is one or more metal elements chosen from among Si, Ge, Sn, Ti, Zr and Hf, including at least Si or Ge; F is fluorine, and Mn is manganese); the method for producing a phosphor comprising:

a dissolution step of dissolving raw materials containing the element A, the element M, F and Mn in a solvent comprising hydrofluoric acid; and a precipitation step of precipitating the phosphor from a solution obtained in the dissolution step; wherein the amounts of the raw materials added during the dissolution step are controlled so as to keep the phosphor at a saturated dissolution level or lower; and the precipitation step is performed by (1) lowering a hydrogen fluoride concentration in the solution by adding water or low-concentration hydrofluoric acid; (2) cooling the solution; or (3) a combination of both (1) and (2).

Effects of the Invention

According to the method for producing a phosphor of the present invention, it is possible to produce a phosphor that has excellent optical properties and that is represented by the general formula $A_2MF_6:Mn^{4+}$.

BRIEF DESCRIPTION OF THE DRAWINGS

FIG. 1 shows X-ray diffraction patterns obtained in Example 1-1 and Comparative Example 1. The vertical axis in the diagram indicates the signal count.

FIG. 2 shows the excitation and fluorescence spectra of the phosphor obtained in Example 1-1.

FIG. 3 shows X-ray diffraction patterns obtained in Example 2-1 and Comparative Example 2. The vertical axis in the diagram indicates the signal count.

FIG. 4 shows the excitation and fluorescence spectra of the phosphor obtained in Example 2-1.

FIG. 5 shows X-ray diffraction patterns obtained in Example 3-1 and Comparative Example 3. The vertical axis in the diagram indicates the signal count.

FIG. 6 shows the excitation and fluorescence spectra of the phosphor obtained in Example 3-1.

FIG. 7 shows X-ray diffraction patterns obtained in Example 4-1 and Comparative Example 4. The vertical axis in the diagram indicates the signal count.

FIG. 8 shows the excitation and fluorescence spectra of the phosphor obtained in Example 4-1.

MODES FOR CARRYING OUT THE INVENTION

The present invention is a method for producing a phosphor represented by the general formula $A_2MF_6:Mn^{4+}$, comprising a dissolution step of dissolving raw materials in a solvent, and a precipitation step of precipitating the phosphor.

<Dissolution Step>

The dissolution step is a step of dissolving raw materials for supplying the element A, the element M, and Mn and F to a solvent comprising hydrofluoric acid.

The element A is an alkali metal element including at least K, and may include Na, Li, Rb and Cs in addition to K. Specifically, K alone, a combination of K and Li, a combination of K and Na, a combination of K and Rb, or a combination of K and Cs is preferred. When including an alkali metal element other than K, the K content should preferably be higher in view of the chemical stability. Preferably, the element A is K alone.

The raw material for supplying the element A should preferably be a compound containing the element A rather than the element A itself, due to the chemical stability thereof. For example, an oxide, a hydroxide, a fluoride or a carbonate of element A may be used.

The element M is one or more metal elements chosen from among Si, Ge, Sn, Ti, Zr and Hf, including at least Si or Ge. Specifically, Si alone, Ge alone, a combination of Si and Ge, a combination of Si and Sn, and a combination of Si and Ti is preferred. Si alone, which has excellent chemical stability, is preferred.

The raw material for supplying the element M should preferably be a compound containing the element M rather than the element M itself, due to the chemical stability thereof. For example, an oxide, a hydroxide, a fluoride or a carbonate of element M may be used.

Mn is manganese. Examples of raw materials for supplying Mn include hexafluoromanganates, permanganates, oxides (other than permanganates), fluorides (other than hexafluoromanganates), chlorides, sulfates and nitrates. Of these, fluorides are preferred for being able to efficiently substitute Mn at the Si sites in the phosphor and providing good luminescence properties, and among fluorides, hexafluoromanganates are preferred. Examples of hexafluoromanganates include $Na_2MnF_6$, $K_2MnF_6$, $Rb_2MnF_6$, $MgMnF_6$, $CaMnF_6$, $SrMnF_6$ and $BaMnF_6$. In particular, $K_2MnF_6$ is preferred for being able to supply, at the same time, F or K (corresponding to the element A) for forming the phosphor, in addition to Mn.

F is fluorine. The raw material for supplying F may be a fluoride used as a raw material for another element (A, M, Mn) or may be hydrofluoric acid, which is a solvent.

Typical examples of the raw materials used in the dissolution step include:
(1) a combination of $K_2SiF_6$ and $K_2MnF_6$; and
(2) a combination of $SiO_2$, $KHF_2$ and $K_2MnF_6$.

Additionally, as the raw materials, the following patterns may be used:
(3) general formula $A_2MF_6:Mn^{4+}$ alone;
(4) combination of general formula $A_2MF_6:Mn^{4+}$ and general formula $A_2MnF_6$;
(5) combination of general formula $A_2MF_6:Mn^{4+}$ and general formula $A_2MF_6$;
(6) combination of general formula $A_2MF_6:Mn^{4+}$, general formula $A_2MnF_6$ and $A_2MF_6$.

The dissolution step is performed by adding and stirring the raw materials of the element A, the element M, Mn and F in hydrofluoric acid as a solvent.

If the hydrogen fluoride concentration in the hydrofluoric acid is higher, then the amount of Mn impurities that are unrelated to the phosphor can be reduced, but if set too high, then the vapor pressure can become high and it can become very dangerous to handle. On the other hand, if the hydrogen fluoride concentration is too low, the yield tends to be lower. For this reason, the hydrogen fluoride concentration in the hydrofluoric acid during the dissolution step should preferably be 40-70 mass %.

The amounts of the element A, the element M, Mn and F that are added are controlled to be within a range that keeps the target phosphor at the saturated dissolution level or lower i.e., within a range not exceeding the limit amount below which the phosphor that is to be generated dissolves in the solvent. This is for the purpose of avoiding precipitation of the phosphor during the dissolution step. If the phosphor precipitates during the dissolution step, there is a tendency for the phosphor grain sizes or the luminescence properties to become uneven.

Additionally, the dissolution step is preferably performed at 10 to 80° C., and more preferably at 20 to 70° C. Within these temperature ranges, there is no need for equipment with excellent heat resistance or corrosion resistance, so safe and low-cost production is possible.

<Precipitation Step>

The precipitation step is performed by:
(1) lowering the hydrogen fluoride concentration in the solution by adding water or low-concentration hydrofluoric acid;
(2) cooling the solution; or
(3) a combination of both (1) and (2).

By causing precipitation using any of the above-mentioned methods, a phosphor of high purity and having excellent optical properties can be obtained.

(1) Lowering the Hydrogen Fluoride Concentration in the Solution by Adding Water or Low-Concentration Hydrofluoric Acid By lowering the hydrogen fluoride concentration in the solution, the saturated dissolution level of the phosphor can be lowered, thereby causing the phosphor to be precipitated. The hydrogen fluoride concentration can be lowered, for example, by adding, to the solution obtained in the dissolution step, water or hydrofluoric acid having a lower concentration than the hydrofluoric acid of the solution, and mixing by natural dispersion or by means of a stirrer. The addition may be performed simultaneously from one location or from multiple locations. Additionally, in some cases, the solution after the dissolution step may be added to the water or the low-concentration hydrofluoric acid.

If the hydrogen fluoride concentration after being lowered is too high, then the phosphor may not be sufficiently precipitated, and if too low, the phosphor may be hydrolyzed and the luminescence properties may be degraded, so the concentration should preferably be 5 to 40 mass %.

(2) Cooling the Solution

The saturated dissolution level of the phosphor depends on the temperature of the solution, such that the saturated dissolution level is higher if the solution temperature is higher, and the saturated dissolution level is lower if the solution temperature is lower. In this embodiment, the phosphor is precipitated by making use of differences in the saturated dissolution level due to temperature changes.

The solution is cooled, for example, by immersing the solution obtained in the dissolution step, while contained inside a container, in a water bath or the like filled with ice water.

While the level of the temperature change due to cooling is not particularly limited, a drop of about 40° C., more preferably about 50° C., from the solution temperature of the solution obtained in the dissolution step is sufficient. Typically, it is preferable to set the temperature of the solution after cooling to −35 to 20° C.

(3) Combination of Both (1) and (2)

The above-mentioned (1) lowering of the hydrogen fluoride concentration in the solution and (2) cooling of the solution may be combined. By lowering the hydrogen fluoride concentration and cooling the solution at the same time, the phosphor can be quickly and efficiently precipitated. As specific methods, pre-cooled water (or ice) or hydrofluoric acid may be added to the solution, or after adding water or hydrofluoric acid, the solution, while contained in a container, may be cooled in a water bath or the like.

<Post-Treatment>

The method for producing a phosphor of the present invention preferably involves, as a post-treatment, a washing step or a classifying step for the phosphor produced in the above-mentioned reaction step.

When performing a washing step, the phosphor is recovered by solid-liquid separation, such as by filtration or the like, and washed with an organic solvent such as methanol, ethanol, acetone or the like. If the phosphor is washed with water, then a portion of the phosphor may hydrolyze and cause brown manganese compounds to be created, thereby lowering the properties of the phosphor. For this reason, during the washing step, it is necessary to use an organic solvent. Additionally, it is possible to dissolve and remove impurities that have been generated in trace amounts by washing the phosphor a number of times with the hydrofluoric acid reaction solution prior to washing with the organic solvent. For the purpose of suppressing hydrolysis of the phosphor, the concentration of the hydrofluoric acid used for washing should preferably be at least 5 mass %. After the washing step, it is preferable to dry the phosphor and completely evaporate the washing solution.

Additionally, by using a sieve having apertures of a predetermined size in order to classify the phosphor, variations in the grain sizes of the phosphor can be suppressed, and the grain sizes can be controlled to be within a certain range.

EXAMPLES

Herebelow, the present invention will be explained in further detail by referring to examples.

In Examples 1 and 2, the precipitation step was performed by lowering the hydrogen fluoride concentration in the solution after the dissolution step, and in Examples 3 and 4, the precipitation step was performed by cooling the solution after the dissolution step.

Example 1-1

A. Phosphor Production Method (1) Production of Raw Material $K_2MnF_6$ Powder $K_2MnF_6$ powder, which was a raw material, was produced in accordance with the following method. 800 ml of hydrofluoric acid at a concentration of 40 mass % was poured into a Teflon (registered trademark) beaker with a capacity of 1 liter, and 260 g of $KHF_2$ powder (manufactured by Wako Pure Chemical Industries, special grade chemical) and 12 g of potassium permanganate powder (manufactured by Wako Pure Chemical Industries, grade 1 chemical) were dissolved therein. While stirring this hydrofluoric acid reaction solution using a magnetic stirrer, 8 ml of 30% hydrogen peroxide water (special grade chemical) were dripped in a little at a time. When the dripped amount of hydrogen peroxide water exceeded some amount, yellow particles began to precipitate, and the color of the reaction solution began to change from purple. The stirring was continued for a while after dripping the predetermined amount of hydrogen peroxide water, then the stirring was stopped and the precipitated particles were allowed to settle. After the precipitated particles settled, the operation of removing the supernatant, adding methanol, stirring and allowing to stand, then removing the supernatant and further adding methanol was repeated until the solution became neutral. Thereafter, the precipitated particles were recovered by filtration, then dried, and the methanol was completely removed by evaporation to obtain 19 g of a $K_2MnF_6$ powder. These operations were all performed at room temperature (20±2° C.).

(2) Dissolution Step

At room temperature, 100 ml of hydrofluoric acid at a concentration of 55 mass % was poured into a Teflon (registered trademark) beaker with a capacity of 500 ml, and 0.82 g of $SiO_2$ (manufactured by Kojundo Chemical Laboratory, purity 99%), 1.21 g of $KHF_2$ powder (manufactured by Wako Pure Chemical Industries, special grade chemical), and 0.50 g of the $K_2MnF_6$ prepared as indicated above were sequentially dissolved therein. The raw materials were added in amounts keeping the phosphor represented by the general formula $A_2MF_6$:$Mn^{4+}$ at the saturated dissolution level or lower.

(3) Precipitation Step 150 ml of water at room temperature was dripped from four locations into the solution obtained in the dissolution step. Due to the addition of water, the hydrogen fluoride concentration in the solution finally became 22 mass %. After adding the water, the solution was stirred for 10 minutes using a magnetic stirrer, then left to stand. Due to being left to stand, solid matter precipitated out and settled to the lower part of the container.

(4) Washing Step

The supernatant was removed and the solid matter was washed with 20 mass % hydrofluoric acid and methanol. The solid matter was separated and recovered by filtration, and the remaining methanol was evaporated away by means of a drying process.

(5) Classifying Step

The dried solid matter was classified, using a nylon sieve having a mesh size of 75 μm, so as to leave only the matter that passed through the sieve, finally resulting in 1.3 g of a yellow $K_2SiF_6$:$Mn^{4+}$ powder.

B. Phosphor Evaluation Method

The crystal phases and optical properties (excitation/fluorescence spectra, absorption rate, internal quantum efficiency, external quantum efficiency, chromaticity coordinates) of the phosphor produced by the method of Example 1-1 were evaluated by the following methods.

Crystal Phase

The X-ray diffraction pattern was measured using an X-ray diffraction apparatus (Rigaku Ultima IV). The measurements were made using a Cu Kα tube. Specifically, it was determined whether or not the pattern was the same as that of a $K_2SiF_6$ crystal.

Optical Properties

The excitation and fluorescence spectra of the phosphor was measured using a fluorescence spectrophotometer (Hitachi High Technologies F-7000). The excitation wavelength of the fluorescence spectrum during this measurement was 455 nm, and the monitored fluorescence wavelength of the excitation spectrum was 632 nm.

Furthermore, the absorption rate, the internal quantum efficiency, the external quantum efficiency and the chromaticity coordinates were determined by the following methods.

First, a standard reflective plate (Labsphere Spectralon) having a reflectivity of 99% was set at a side-surface aperture (ϕ 10 mm) of an integrating sphere (ϕ 60 mm), and monochromatic light divided into a wavelength of 455 nm from an emission light source (Xe lamp) was guided to this integrating sphere by an optical fiber, and the spectrum of the reflected light was measured using a spectrophotometer (Otsuka Electronics MCPD-7000). At that time, the number of excitation light photons (Qex) was calculated using the spectrum in the wavelength range of 450 to 465 nm.

Next, recessed cells filled with the phosphor so that the surfaces were flat were set at the aperture of the integrating sphere and illuminated with monochromatic light of wavelength 455 nm, and the spectra of the reflected excitation light and the fluorescent light were measured by the spectrophotometer.

The number of photons of the reflected excitation light (Qref) and the number of photons of fluorescent light (Qem) were calculated from the resulting spectral data.

The number of reflected excitation light photons was calculated in the same wavelength range as the number of excitation light photons, and the number of fluorescent light photons was calculated in the range of 465 to 800 nm. From the numbers of these three types of photons, the absorption rate (=(Qex−Qref)/Qex×100), the external quantum efficiency (=Qem/Qex×100) and the internal quantum efficiency (=Qem/(Qex−Qref)×100) were determined.

The chromaticity coordinates x and y were calculated using a CIE0 1931 color-matching function in accordance with the calculation method in the XYZ colorimetric system defined in JIS Z 8701, using a method compliant with JIS Z 8724 (Methods of Color Measurement—Light-source color—) for the spectrum measured by setting the phosphor. The wavelength range used for the chromaticity coordinate calculation was 465 to 780 nm.

C. Evaluation Results

As shown in FIG. 1, the phosphor produced in Example 1-1 was confirmed as having the same pattern as that of a $K_2SiF_6$ crystal, and as not including any other crystal phases. Additionally, as shown in FIG. 2, there were two excitation bands, for ultraviolet light having a peak wavelength in the vicinity of 350 nm and for blue light having a peak wavelength in the vicinity of 450 nm, and multiple narrow-band emissions in the red region from 600 to 700 nm.

As shown in Table 1 below, the absorption rate, the internal quantum efficiency and the external quantum efficiency of the phosphor produced in Example 1-1 were respectively 82%, 74% and 61%. Additionally, the chromaticity coordinates (x, y) were (0.694, 0.306).

TABLE 1

| | Optical Properties (excitation at 455 nm) | | | | |
|---|---|---|---|---|---|
| | Absorption Rate (%) | Internal Quantum Efficiency (%) | External Quantum Efficiency (%) | Chromaticity x | Chromaticity y |
| Comparative Example 1 | 33 | 77 | 25 | 0.681 | 0.308 |
| Example 1-1 | 82 | 74 | 61 | 0.694 | 0.306 |
| Example 1-2 | 78 | 73 | 57 | 0.692 | 0.306 |
| Example 1-3 | 88 | 62 | 55 | 0.691 | 0.306 |

Comparative Example 1

In Comparative Example 1, a phosphor was produced using the same method as in Example 1-1, except that the water used in the precipitation step in Example 1-1 was changed to methanol, which is an organic compound-based poor solvent.

As shown in FIG. 1, the phosphor produced in Comparative Example 1 was confirmed as having the same pattern as that of a $K_2SiF_6$ crystal, and as not including any other crystal phases.

However, as shown in Table 1, the phosphor produced in Comparative Example 1 had optical properties that were significantly inferior in comparison with the phosphor of Example 1-1. The main reason for this is thought to be due to the fact that, in Comparative Example 1, an organic solvent was added as the poor solvent during the precipitation step, as a result of which $Mn^{4+}$, which is the emission center, was not able to stably exist.

Example 1-2

In Example 1-2, a phosphor was produced using the same method as in Example 1-1, except that the amounts of the raw materials in Example 1-1 were changed, by changing the amount of the $SiO_2$ powder from 0.82 g to 1.64 g, the amount of the $KHF_2$ powder from 1.21 g to 2.43 g and the amount of the $K_2MnF_6$ powder from 0.50 g to 1.00 g.

Example 1-3

In Example 1-3, a phosphor was produced using the same method as in Example 1-1, except that the hydrogen fluoride concentration in the hydrofluoric acid, which is the solvent in Example 1-1, was changed from 55 mass % to 60 mass %, and the amounts of the raw materials were changed, by changing the amount of the $SiO_2$ from 0.82 g to 1.44 g, the amount of the $KHF_2$ from 1.21 g to 5.07 g and the amount of the $K_2MnF_6$ powder from 0.50 g to 1.44 g.

Regarding the optical properties of Example 1-2 and Example 1-3, the external quantum efficiencies were slightly lower than that of Example 1-1, but both were acceptable values.

Example 2-1

A. Phosphor Production Method

At room temperature, 100 ml of hydrofluoric acid at a concentration of 55 mass % was poured into a Teflon (registered trademark) beaker with a capacity of 500 ml, and 3 g of $K_2SiF_6$ powder (manufactured by Kanto Kagaku, Cica Special Grade)), and 0.50 g of the $K_2MnF_6$ powder prepared in the above-described Example 1-1, "(1) Production of raw material $K_2MnF_6$ powder" were sequentially dissolved therein. The raw materials were added in amounts keeping the phosphor represented by the general formula $A_2MF_6$:$Mn^{4+}$ at the saturated dissolution level or lower.

150 ml of water at room temperature was dripped from two locations into the obtained solution. Due to the addition of water, the hydrogen fluoride concentration in the solution finally became 22 mass %. After adding the water, the solution was stirred for 10 minutes using a magnetic stirrer, then left to stand. Due to being left to stand, solid matter precipitated out and settled to the lower part of the container.

The supernatant was removed and the solid matter was washed with 20 mass % hydrofluoric acid and methanol. The solid matter was separated and recovered by filtration, and the remaining methanol was evaporated away by means of a drying process.

The dried solid matter was classified, using a nylon sieve having a mesh size of 75 μm, so as to leave only the matter that passed through the sieve, finally resulting in 1.3 g of a yellow $K_2SiF_6$:$Mn^{4+}$ powder.

B. Phosphor Evaluation Method

The crystal phases and optical properties (excitation/fluorescence spectra, absorption rate, internal quantum efficiency, external quantum efficiency, chromaticity coordinates) of the phosphor produced by the method of Example 2-1 were evaluated in accordance with the same method as that used in Example 1-1.

C. Evaluation Results

As shown in FIG. 3, the phosphor produced in Example 2-1 was confirmed as having the same pattern as that of a $K_2SiF_6$ crystal, and as not including any other crystal phases. Additionally, as shown in FIG. 4, there were two excitation bands, for ultraviolet light having a peak wavelength in the vicinity of 350 nm and for blue light having a peak wavelength in the vicinity of 450 nm, and multiple narrow-band emissions in the red region from 600 to 700 nm.

As shown in Table 2 below, the absorption rate, the internal quantum efficiency and the external quantum efficiency of the phosphor produced in Example 2-1 were respectively 73%, 72% and 53%. Additionally, the chromaticity coordinates (x, y) were (0.692, 0.306).

TABLE 2

| | Optical Properties (excitation at 455 nm) | | | | |
| --- | --- | --- | --- | --- | --- |
| | Absorption Rate (%) | Internal Quantum Efficiency (%) | External Quantum Efficiency (%) | Chromaticity x | Chromaticity y |
| Example 2-1 | 73 | 72 | 53 | 0.692 | 0.306 |
| Example 2-2 | 61 | 68 | 41 | 0.691 | 0.306 |
| Example 2-3 | 82 | 70 | 57 | 0.687 | 0.307 |
| Comparative Example 2 | 33 | 77 | 25 | 0.681 | 0.308 |

Comparative Example 2

In Comparative Example 2, a phosphor was produced using the same method as in Example 2-1, except that the water used in the precipitation step in Example 2-1 was changed to methanol, which is an organic compound-based poor solvent.

As shown in FIG. 3, the phosphor produced in Comparative Example 2 was confirmed as having the same pattern as that of a $K_2SiF_6$ crystal, and as not including any other crystal phases.

However, as shown in Table 2, the phosphor produced in Comparative Example 2 had optical properties that were significantly inferior in comparison with the phosphor of Example 2-1. The main reason for this is thought to be due to the fact that, in Comparative Example 2, an organic solvent was added as the poor solvent during the precipitation step, as a result of which $Mn^{4+}$, which is the emission center, was not able to stably exist.

Example 2-2

In Example 2-2, a phosphor was produced using the same method as in Example 2-1, except that the amount of the $K_2MnF_6$ powder, which is a raw material in Example 2-1, was changed from 0.50 g to 0.25 g.

Example 2-3

In Example 2-3, a phosphor was produced using the same method as in Example 2-1, except that the hydrogen fluoride concentration in the hydrofluoric acid, which is the solvent in Example 2-1, was changed from 55 mass % to 60 mass %, and the amount of the $K_2MnF_6$, which is a raw material, was changed from 0.50 g to 1.00 g.

The phosphors of both Example 2-2 and Example 2-3 had very good luminescence properties in comparison with Comparative Example 2.

Example 3-1

A. Phosphor Production Method 100 ml of hydrofluoric acid at a concentration of 55 mass % was poured into a Teflon (registered trademark) beaker with a capacity of 500 ml, and 1.59 g of $SiO_2$ powder (manufactured by Kojundo Chemical Laboratory, purity 99%), 4.24 g of $KHF_2$ powder (manufactured by Wako Pure Chemical Industries, special grade chemical), and 0.67 g of the $K_2MnF_6$ powder prepared in the above-described Example 1-1, "(1) Production of raw material $K_2MnF_6$ powder" were sequentially dissolved therein and stirred. The raw materials were added in amounts keeping the phosphor represented by the general formula $A_2MF_6$:$Mn^{4+}$ at the saturated dissolution level or lower.

The temperature of this solution was cooled to 15° C. In order to lower the temperature, a method of placing a beaker containing the solution in which the raw materials were dissolved in a bath filled with ice water was used. The precipitation of solid matter due to the drop in temperature was confirmed by visual observation.

After the temperature of the solution reached 15° C., the beaker was removed from the bath, stirred with a magnetic stirrer for 10 minutes at a room temperature of 20±2° C., then left to stand. All of the subsequent operations were performed at the same room temperature. Due to being left to stand, solid matter precipitated out and settled to the lower part of the container.

After confirming that the solid matter had settled, the supernatant was removed and the solid matter was washed with 20 mass % hydrofluoric acid and methanol. The solid matter was separated and recovered by filtration, and the remaining methanol was evaporated away by means of a drying process.

The dried solid matter was classified, using a nylon sieve having a mesh size of 75 μm, so as to leave only the matter that passed through the sieve, finally resulting in 1.9 g of a yellow $K_2SiF_6$:$Mn^{4+}$ powder.

B. Phosphor Evaluation Method

The crystal phases and optical properties (excitation/fluorescence spectra, absorption rate, internal quantum efficiency, external quantum efficiency, chromaticity coordinates) of the phosphor produced by the method of Example 3-1 were evaluated in accordance with the same method as that used in Example 1-1.

C. Evaluation Results

As shown in FIG. 5, the phosphor produced in Example 3-1 was confirmed as having the same pattern as that of a $K_2SiF_6$ crystal, and as not including any other crystal phases. Additionally, as shown in FIG. 6, there were two excitation bands, for ultraviolet light having a peak wavelength in the vicinity of 350 nm and for blue light having a peak wavelength in the vicinity of 450 nm, and multiple narrow-band emissions in the red region from 600 to 700 nm.

As shown in Table 3 below, the absorption rate, the internal quantum efficiency and the external quantum efficiency of the phosphor produced in Example 3-1 were respectively 73%, 79% and 58%. Additionally, the chromaticity coordinates (x, y) were (0.691, 0.306).

TABLE 3

| | Optical Properties (excitation at 455 nm) | | | | |
|---|---|---|---|---|---|
| | Absorption Rate (%) | Internal Quantum Efficiency (%) | External Quantum Efficiency (%) | Chromaticity x | Chromaticity y |
| Example 3-1 | 73 | 79 | 58 | 0.691 | 0.306 |
| Example 3-2 | 80 | 74 | 59 | 0.691 | 0.307 |
| Comparative Example 3 | 33 | 77 | 25 | 0.681 | 0.308 |

Comparative Example 3

In Comparative Example 3, a phosphor was produced using the same method as in Example 3-1, except that the precipitation step was changed from cooling the solution to adding 150 ml of methanol, which is an organic compound-based poor solvent.

As shown in FIG. 5, the phosphor produced in Comparative Example 3 was confirmed as having the same pattern as that of a $K_2SiF_6$ crystal, and as not including any other crystal phases.

However, as shown in Table 3, the phosphor produced in Comparative Example 3 had optical properties that were significantly inferior in comparison with the phosphor of Example 3-1. The main reason for this is thought to be due to the fact that, in Comparative Example 3, an organic solvent was added as the poor solvent during the precipitation step, as a result of which $Mn^{4+}$, which is the emission center, was not able to stably exist.

Example 3-2

In Example 3-2, a phosphor was produced using the same method as in Example 3-1, except that the amount of the $K_2MnF_6$ powder, which is a raw material in Example 3-1, was changed from 0.67 g to 1.17 g. The phosphor of Example 3-2 also had very good luminescence properties in comparison with Comparative Example 3.

Additionally, while not shown in the table, it was confirmed that excellent luminescence properties similar to those of the above-mentioned Examples 3-1 and 3-2 were obtained when K and Li, K and Na, K and Rb, and K and Cs were used as the element A, and Ge alone, Si and Ge, Si and Sn, and Si and Ti were used as the element M.

Example 4-1

A. Phosphor Production Method 100 ml of hydrofluoric acid at a concentration of 55 mass % was poured into a Teflon (registered trademark) beaker with a capacity of 500 ml, and in a water bath set at 65° C., 2.4 g of a $K_2SiF_6$ powder (manufactured by Wako Pure Chemical Industries, grade 1 chemical) and 0.2 g of the $K_2MnF_6$ powder prepared in the above-described Example 1-1, "(1) Production of raw material $K_2MnF_6$ powder" were sequentially dissolved therein and stirred. The raw materials were added in amounts keeping the phosphor represented by the general formula $A_2MF_6:Mn^{4+}$ at the saturated dissolution level or lower.

The temperature of this solution was cooled to 15° C. In order to lower the temperature, a method of placing a beaker containing the solution in which the raw materials were dissolved in a bath filled with ice water was used. The precipitation of solid matter due to the drop in temperature was confirmed by visual observation.

After the temperature of the solution reached 15° C., the beaker was removed from the bath, stirred with a magnetic stirrer for 10 minutes at room temperature, i.e., 20±2° C., then left to stand. All of the subsequent operations were performed at the same room temperature. Due to being left to stand, solid matter precipitated out and settled to the lower part of the container.

After confirming that the solid matter had settled, the supernatant was removed and the solid matter was washed with 20 mass % hydrofluoric acid and methanol. The solid matter was separated and recovered by filtration, and the remaining methanol was evaporated away by means of a drying process.

The dried solid matter was classified, using a nylon sieve having a mesh size of 75 μm, so as to leave only the matter that passed through the sieve, finally resulting in 1.2 g of a yellow $K_2SiF_6:Mn^{4+}$ powder.

B. Phosphor Evaluation Method

The crystal phases and optical properties (excitation/fluorescence spectra, absorption rate, internal quantum efficiency, external quantum efficiency, chromaticity coordinates) of the phosphor produced by the method of Example 4-1 were evaluated in accordance with the same method as that used in Example 1-1.

C. Evaluation Results

As shown in FIG. 7, the phosphor produced in Example 4-1 was confirmed as having the same pattern as that of a $K_2SiF_6$ crystal, and as not including any other crystal phases. Additionally, as shown in FIG. 8, there were two excitation bands, for ultraviolet light having a peak wavelength in the vicinity of 350 nm and for blue light having a peak wavelength in the vicinity of 450 nm, and multiple narrow-band emissions in the red region from 600 to 700 nm.

As shown in Table 4 below, the absorption rate, the internal quantum efficiency and the external quantum efficiency of the phosphor produced in Example 4-1 were respectively 71%, 81% and 58%. Additionally, the chromaticity coordinates (x, y) were (0.693, 0.306).

TABLE 4

| | Optical Properties (excitation at 455 nm) | | | | |
|---|---|---|---|---|---|
| | Absorption Rate (%) | Internal Quantum Efficiency (%) | External Quantum Efficiency (%) | Chromaticity x | Chromaticity y |
| Example 4-1 | 73 | 81 | 58 | 0.693 | 0.306 |
| Example 4-2 | 80 | 77 | 62 | 0.691 | 0.308 |
| Comparative Example 4 | 33 | 77 | 25 | 0.681 | 0.308 |

Comparative Example 4

In Comparative Example 4, a phosphor was produced using the same method as in Example 4-1, except that the precipitation step was changed from cooling the solution to adding 150 ml of methanol, which is an organic compound-based poor solvent.

As shown in FIG. 7, the phosphor produced in Comparative Example 4 was confirmed as having the same pattern as that of a $K_2SiF_6$ crystal, and as not including any other crystal phases.

However, as shown in Table 4, the phosphor produced in Comparative Example 4 had optical properties that were significantly inferior in comparison with the phosphor of Example 4-1. The main reason for this is thought to be due to the fact that, in Comparative Example 4, an organic solvent was added as the poor solvent during the precipitation step, as a result of which $Mn^{4+}$, which is the emission center, was not able to stably exist.

Example 4-2

In Example 4-2, a phosphor was produced using the same method as in Example 4-1, except that the amount of the $K_2MnF_6$ powder, which is a raw material in Example 4-1, was changed from 0.2 g to 0.4 g. The phosphor of Example 4-2 also had very good luminescence properties in comparison with Comparative Example 4.

Additionally, while not shown in the table, it was confirmed that excellent luminescence properties similar to those of the above-mentioned Examples 4-1 and 4-2 were obtained when K and Li, K and Na, K and Rb, and K and Cs were used as the element A, and Ge alone, Si and Ge, Si and Sn, and Si and Ti were used as the element M.

The invention claimed is:

1. A method for producing a phosphor represented by the general formula $A_2MF_6:Mn^{4+}$(where the element A is an alkali metal element including at least K; the element M is one or more metal elements chosen from among Si, Ge, Sn, Ti, Zr and Hf, including at least Si or Ge; F is fluorine, and Mn is manganese); the method for producing a phosphor comprising:
 a dissolution step of dissolving raw materials containing the element A, the element M, F and Mn in a solvent comprising hydrofluoric acid; and
 a precipitation step of precipitating the phosphor from a solution obtained in the dissolution step; wherein
 the amounts of the raw materials added during the dissolution step are controlled so as to keep the phosphor at a saturated dissolution level or lower; and
 the precipitation step is performed by lowering a hydrogen fluoride concentration in the solution by adding water or low-concentration hydrofluoric acid.

2. The production method according to claim 1, wherein a hydrogen fluoride concentration in the hydrofluoric acid used in the dissolution step is 40-70 mass %.

3. The production method according to claim 1, wherein the hydrogen fluoride concentration in the solution is lowered to be within a range of 5 to 40 mass % by dilution with water or low-concentration hydrofluoric acid.

4. The production method according to claim 1, wherein the precipitation step further comprises cooling the solution to within a range of −35 to 20° C.

5. The production method according to claim 1, wherein the element A is potassium and the element M is silicon.

* * * * *